United States Patent [19]
Melchior et al.

[11] Patent Number: 4,785,635
[45] Date of Patent: Nov. 22, 1988

[54] SUPERCHARGED INTERNAL COMBUSTION ENGINES

[75] Inventors: Jean F. Melchior; Thierry M. Andre, both of Paris, France

[73] Assignee: Etat Francais, France

[21] Appl. No.: 887,143

[22] Filed: Jul. 17, 1986

[30] Foreign Application Priority Data

Jul. 18, 1985 [FR] France ................ 85 11009

[51] Int. Cl.$^4$ .................................. F02B 37/00
[52] U.S. Cl. ........................................ 60/606
[58] Field of Search ................. 60/605, 606, 612

[56] References Cited

U.S. PATENT DOCUMENTS

| 4,026,115 | 5/1977 | Melchior et al. | 60/606 X |
| 4,089,173 | 5/1978 | Melchior et al. | 60/606 |
| 4,125,999 | 11/1978 | Melchior | 60/606 |
| 4,233,815 | 11/1980 | Melchior | 60/606 |
| 4,288,988 | 9/1981 | Curtil | 60/605 |
| 4,373,336 | 2/1983 | Horler et al. | 60/606 |
| 4,404,805 | 9/1983 | Curtil | 60/606 |
| 4,430,860 | 2/1984 | Melchior et al. | 60/606 |

FOREIGN PATENT DOCUMENTS

| 68517 | 1/1983 | European Pat. Off. | 60/606 |
| 3244927 | 6/1984 | Fed. Rep. of Germany | 60/606 |

Primary Examiner—Michael Koczo
Attorney, Agent, or Firm—Barnes, Kisselle, Raisch, Choate, Whittemore & Hulbert

[57] ABSTRACT

In an engine (1), supercharged by a turbocompressor unit and provided with a bypass pipe (14), the exhaust gas manifold (13) of the engine has a small and constant section, the junction between the bypass pipe (14) and the gas inlet (11) of the turbine (5) is located upstream of the first junction (18) between the manifold (13) and pipes (12) connecting the work chambers (2) of the engine (1) to the manifold (13) and the bypass pipe (14) includes throttling means (15) which are such that the difference between the total pressures prevailing directly in the outlet (7) of the compressor (6) and upstream of the turbine (5) substantially only depend on the first of said pressures.

18 Claims, 8 Drawing Sheets

SUPERCHARGED INTERNAL COMBUSTION ENGINES

The invention relates to internal combustion engines having work chambers of variable volume each provided with at least one air inlet and at least one gas outlet, these engines being supercharged by a turbocompressor unit comprising at least one compressor mechanically driven by at least one turbine, wherein said air inlets communicate with the air outlet of the compressor while each of said gas outlets communicates through a gas pipe with at least one exhaust gas manifold connected to the gas inlet of the turbine, said engines further comprising a bypass pipe which connects the air outlet of the compressor to the gas inlet of the turbine in bypassing the work chambers and which is provided with throttling means having a variable section of passage adapted to produce such a pressure drop that the resulting pressure difference between the outlet of the compressor and the inlet of the turbine only depends substantilly on the value of the pressure prevailing in the air outlet of the compressor.

In supercharged internal combustion engines, it is sought to obtain a maximum pressure with a minimum supercharging air rate of flow and a maximum efficiency.

Among the loss factors of such engines, one of the most important resides in the fact that it is not known how to recover the whole of the energy utilizable in the work chambers at the end of the expansion stroke. This utilizable energy is very considerable compared to the mechanical energy recovered at the shaft of the engine. It may be as much as 20% of the latter.

Owing to the heating of the gases produced by the combustion of the fuel in the work chambers, the pressure prevailing in the latter at the end of the expansion is much higher than the pressure prevailing in the work chambers at the beginning of the compression stroke. By way of example, if the temperature of the air at the beginning of the compression (at the point of maximum value of the work chambers, termed "Bottom Dead Centre" or "BDC") is 100° C. and if this temperature is 900° C. at the same BDC at the end of the expansion stroke, the pressure is then:

$$(900+273)/(100+273)=3.15$$

times higher than the pressure prevailing in the inlet manifold and still higher than the pressure prevailing in the exhaust gas manifold.

At the moment when the communication between the work chambers and the exhaust gas manifold is opened at the end of the expansion stroke, a sudden drop therefore occurs, without recovery of work, in the pressure prevailing in the work chambers. There is consequently a very high loss of useful energy which is then available in the work chambers and which represents, as recalled hereinbefore, a very large proportion of the mechanical energy receveid by the shaft of the engine.

It is well known that a means for improving the performances of the engine (by increasing the effective power and the efficiency and by correspondingly reducing the specific air flow) consists in reducing this loss of utilizable energy available at the exhaust of the engine by improving the connection between the work chambers and the exhaust gas manifold of the engine.

The utilizable energy available in the work chambers at the end of the expansion stroke may be partially recovered by associating with the internal combustion engine a supercharging turbocompressor.

Although the invention is applicable to any internal combustion engine, whether it is of the type having a controlled ignition or an ignition by compression, or of the four-stroke or two-stroke type, the invention will be described here, in order to facilitate the description, within the framework of four-stroke engines supercharged by a turbocompressor. In respect of these engines, it is known to partly recover the utilizable energy available in the work chambers at the end of the expansion by putting the chambers in communication, by means of gas pipes, with at least one exhaust gas manifold which leads to the inlet of the turbine. Bearing in mind the temperature of the gases at the inlet of the turbine, it is possible for the latter to drive the air compressor with an expansion rate markedly lower than the pressure ratio of the compressor, this being all the more so as the overall efficiency of the turbocompressor is higher (this overall efficiency being the product of the individual isentropic efficiencies of the compressor and turbine and the mechanical and the mechanical and volumetric efficiency of the turbocompressor).

When the volume of the exhaust gas manifold is large, if it is compared for example with the total capacity of the work chambers, the rate of flow of the gases in this manifold is low and the total pressure (static+dynamic) $P_3$ of the gases at the inlet of the turbine is substantially the same as the static pressure $P_5$ prevailing in the exhaust gas manifold. There has thus been realized a "constant pressure" manifold. Consequently, the four-stroke engine aspirates air during the aspiration travel at a pressure distinctly higher than the pressure prevailing in the exhaust gas manifold; the work involved in discharging the gases during the exhaust stroke will therefore be less than the work received by the piston during the aspiration travel. This positive work of transfer, which is added to the positive work developed during the driving cycle (compression-expansion), is in fact taken from the utilizable energy available in the work chambers at the end of the expansion.

Such a recovery is therefore directly related to the relative difference:

$$(P_2' - P_3/P_2')$$

between the pressures $P_2'$ and $P_3$ respectively prevailing in the air and exhaust gas manifolds, therefore at the terminals of the work chambers of the engine.

As an example, by arranging a supercharging unit with modern turbocompressors having a high overall efficiency (on the order of 70%) arranged in two compression stages in series, with an intermediate cooling at 45° C., it is possible to compress the supercharging air to 10 absolute bars by driving the turbines, also arranged in series, with gases at 650° C. total temperature and a total absolute pressure of only 5 bars. With such assemblies, there is thus available a pressure difference of $\Delta Pm = 5$ bars at the terminals of the engine and a potential energy recoverable on the shaft of the engine of:

$$(P'_2 \times \text{Cap}) - (P_3 \times \text{Cap}) = \Delta Pm \times \text{Cap}$$

in which Cap represents the capacity, i.e. the difference between the maximum volume and the minimum volume of the work chambers.

This energy directly recoverable on the shaft of the engine, which is added to that recovered during the driving cycle owing to the internal combustion of the fuel introduced into the work chambers, constitutes a free energy which increases the power of the engine, reduces the specific air flow (in kg of air per kW.h supplied) and therefore the size and the cost of the component parts ensuring the supercharging and finally increases the efficiency of the installation while reducing the specific consumption of fuel.

Bearing in mind the temperature of the gases available at the inlet of the turbine and the overall efficiency of the turbocompressor, this recoverable potential energy can be still further increased if it is observed that the pistons moving in the work chambers of the engine are only responsive, during the intake and exhaust strokes, to the static (and not total) pressures prevailing respectively upstream and downstream of these chambers, the velocities of the pistons being indeed in the order of 10 m/s, i.e. very low as compared with the velocity of sound. If the communication between the outlet of the work chambers and the inlet of the turbine is so arranged that the column of gas flowing in the exhaust gas manifold is speeded up to a high Mach number (i.e. which is at least 0.3 and may reach or even exceed 0.8), the static pressure prevailing in the exhaust manifold will be markedly lowered.

As an example, the speeding up to a Mach number 0.75 of a column of gas whose total pressure is 5 bars and total temperature 650° C., will lower the static pressure to the absolute value of 3.5 bars. The lowering of the temperature will be of 78° C., the static temperature of the flow in the exhaust gas manifold being therefore 572° C.

On the other hand, the turbocompressor is by essence a machine which is responsive to the total pressures and temperatures, owing to the flow rates which reach therein Mach numbers in the neighbourhood of unity. In the case treated hereinbefore as an example if the total pressure and the total temperature are maintained respectively at 5 bars (absolute pressure) and 650° C., the pressure of the air available in the intake manifold of the engine (to the extent that this manifold is dimensioned so that the air velocitie therein remain low) will remain equal to 10 bars. The static pressure difference at the terminals of the engine will therefore pass from 10−5=5 bars to 10−3.5=6.5 bars, thus increasing by 30% the energy recoverable at the exhaust of the engine.

The energy required to speed up the column of gas flowing in the exhaust gas manifold is taken from the utilizable energy available in the work chambers at the end of the expansion stroke. An arrangement of the communication between the work chambers and the inlet of the turbine of the type mentioned hereinbefore and capable of effectively producing this speeding up of the column of gas in the exhaust manifold, is known and has been disclosed for example in U.S. Pat. Nos. 4,288,988 and 4,404,805.

Such an arrangement requires the following constructional features:

A. An extremely short connection of small volume between the outlet of the work chambers and the exhaust gas manifold by the use of pipes in the shape of convergent nozzles having a ratio of the inlet section (work chamber end) to the outlet section (manifold end) preferably around 2 and having an outlet oriented in the direction of the flow in the exhaust gas manifold. The very small volume and the restriction of the section of passage of these pipes have for effect to favour the recovery of the energy available in the work chambers at the beginning of the exhaust stage. The pressure in the pipe indeed rises very rapidly as soon as the exhaust distributing element is opened and thus approaches the pressure prevailing in the work chambers, which considerably reduces the loss of energy by the throttling effect in the passage of said distributing element. The utilizable energy available in the work chambers at the end of the expansion is thus preserved to the maximum extent. The acceleration in the convergent pipe and the orientation of the latter in the direction of the flow in the exhaust gas manifold enables this potential energy to be effectively converted into kinetic energy which contributes in the acceleration of the column of gas flowing in said manifold.

B. The grouping of the exhaust of a plurality of work chambers in a exhaust gas manifold whose diameter is small with respect to the diameter of the piston (usually on the order of one half).

The dimensioning of the manifold may be expressed as follows:

$$Se = (n \cdot Sp) \times \frac{Vp}{Ve} \times \frac{\rho'_2}{\rho_5} \times \frac{\alpha}{2k}$$

in which:
Se = section of the exhaust gas manifold
Sp = cross-sectional area of each piston
n = number of pistons
n·SP = total cross-sectional area of the pistons whose cylinders are connected to the same exhaust gas manifold
Vp = mean velocity of each piston
Ve = velocity of the gases at the downstream end of the exhaust gas manifold
$\rho'_2$ = density of the intake air
$\rho_5$ = density of the exhaust gases
α = flow coefficient of the engine (between 0.5 and 1.2)
k = 1 (two-stroke engine) or 2 (four-stroke engine); the Mach number of the flow of the gases at the downstream end of the manifold being:

$$M = \frac{Ve}{a5},$$

in which:

$$a5 = \sqrt{1.33 \times 287 \times T5}$$

where:
T5 = exhaust temperature in °K., if T5 = 873° K. (600° C.), a5 = 577 m/s, M = 0.3 and Ve = 173 m/s.

C. The regulation of the order of ignition of the different work chambers grouped with the same exhaust gas manifold so as to organize an injection of a quantity of motion from each work chamber which is as regular as possible and the least disturbing of the exhaust of one chamber to the other.

D. A connection which is as simple and as short as possible between the downstream end (in the direction of flow of the gases) and the inlet of the turbine so as to avoid to the maximum extent the total pressure losses of the flow at high velocity, either due to friction or due to variations in the path (bend, or sudden variation in the section); as an example, the total pressure loss due to friction of a gas flow having a Mach number equal to 0.7 is on the order of 1% per unit length equal to the diameter of the manifold.

E. The optional interposition between the downstream end of the exhaust gas manifold and the inlet of the turbine, of a diffuser capable of slowing down the flow to a Mach number on the order of 0.25. But, as the flow will then be again accelerated up to the Mach number on the order of 1 (usually in a ring of fixed nozzles, termed "distributor") before penetrating the turbine wheel, it is clear that it may be preferable to avoid this slowing down in the diffuser then the acceleration in the distributor by replacing the aforementioned feature E by the following:

E'. The arrangement of the housing for the entry of the gases into the turbine so as to maintain the velocity of the gases substantially constant until they enter the expansion wheel of the turbine.

The arrangement of the connection between the work chambers and the expansion wheel of the turbine of the type described hereinbefore, enables a large part of the utilizable energy available in the work chambers to be recovered at the end of the expansion stroke.

It is moreover known that the use of turbocompresors having very high performances and high pressure ratios presents delicate problems of adaptation to an internal combustion engine having combustion chambers of variable volume, in particular to avoid the undesirable phenomenon of surge of the turbocompressor which arises when the compressor has been adjusted to operate in its zone of maximum efficiency.

This phenomenon may be eliminated by the additinon of a bypass pipe which connects the air outlet of the compressor to the gas inlet of the turbine in bypassing the work chambers and which is provided with throttling means having a variable section of passage so adapted as to produce such a pressure drop that the resulting pressure difference between the outlet of the compressor and the inlet of the turbine substantially only depends on the value of the pressure prevailing at any point of the circuit connecting the air outlet of the compressor to the gas inlet of the turbine. This arrangement has been disclosed in particular in U.S. Pat. Nos. 3,988,894; 4,125,999 and 4,233,815. As is clear from the first paragraph of the description of the instant application, it is to engines equipped with such a bypass pipe that the invention relates.

Further, if it is desired to construct an engine which is capable of delivering high power while accepting very high supercharging air pressures (higher than 5 bars and capable of reaching or even exceeding 10 bars), without mechanical overloading, it is known to reduce its effective volumeric compression ratio (i.e., the ratio between the volume of the work chambers at the beginning of the compression and the minimum volume of these chambers) to values which may be equal to or even lower than 7. In this case, the engine experiences difficulties in starting up and in operating at low power, which may be eliminated by the addition of an auxiliary combustion chamber which is fed with fresh air through a bypass pipe and which enables the turbocompressor to operate independently of the engine, and even when the latter is not operating, if the turbocompressor is equipped with independent starting up means. Such an arrangement is disclosed for example in U.S. Pat. Nos. 4,125,999; 4,025,115; and 4,430,860. As will be clear from the following, the invention preferably, but not exclusively, concerns engines equipped with such an auxiliary combustion chamber.

The combination of the two techniques mentioned hereinbefore and disclosed respectively in U.S. Pat. Nos. 4,288,988, 4,404,805 and 3,988,894, 4,125,999 and 4,233,815, which would permit the construction of engines having both very high specific powers and high efficiencies, presents however technical problems which have not been solved satisfactorily up to the present time.

The main object of the invention is to solve these technical problems.

For this purpose, the invention provides an internal combustion engine having work chambers of variable volume each provided with at least one air inlet and at least one exhaust gas outlet, said engine being supercharged by a turbocompressor unit comprising at least one compressor mechanically driven by at least one turbine, each of said air inlets communicating with the air outlet of the compressor while each of said gas outlets communicates through a gas pipe with at least one exhaust gas manifold connected to the gas inlet of the turbine, said engine further comprising a bypass pipe which connects the air outlet of the compressor to the gas inlet of the turbine in bypassing the work chambers and which is provided with throttling means having a variable section of passage so adapted as to produce such a pressure drop that the resulting pressure difference between the outlet of the compressor and the inlet of the turbine substantially only depends on the value of the pressure prevailing in said air outlet of the compressor, in which engines, in combination:

a. the exhaust gas manifold has a substantially constant section which is sufficiently small so that, when the engine is running at the rated speed, the velocity of flow of the gases in the manifold, directly downstream of the last junction with said pipes, is equal to at least the Mach number 0.3;

b. the junction between the bypass pipe downstream of the throttling means and the gas inlet of the turbine is located upstream, realative to the direction of flow of the gases coming from the work chambers and circulating in the exhaust gas manifold, of the first junction between said manifold and said pipes;

c. said throttling means are so adapted that the sum of the forces, due to the pressure drop they produce applied to said throttling means, is compensated by a balancing force which is such that the resultant of said forces is substantially nil, and d. said throttling means are connected to a control means responsive to a first parameter of operation of the engine related in a bi-univocal manner to the total pressure prevailing directly in the outlet of the compressor and to a second parameter of operation of the engine related in a bi-univocal manner to the total pressure prevailing directly downstream of the turbine, said control means being so adapted that, on one hand, it tends to close the throttling means when said two pressures tend to approach each other, and, reciprocally, tends to open said throttling means when said pressures tend to depart from each other, and that, on the the other hand, the difference between said pressures depends substantially only on the total pressure prevailing in the outlet of the compressor and varies in the same direction as said total pressure.

The variation of the first parameter of operation of the engine versus the total pessure prevailing directly in the outlet of the compressor is said to be "bi-univocal" when any given value of said first parameter of operation of the engine corresponds to one value only of said total pressure prevailing directly in the outlet of the compressor, and conversely, when to any given value of said total pressure prevailing directly in the outlet of the compressor, there corresponds one value only of said first parameter of operation of the engine. The second paratmeter of operation of the engine versus the total pressure prevailing directly downstream of the turbine is likewise to be so understood by the term "bi-univocal".

Preferably, said pipes each have the shape of a convergent nozzle whose outlet, at the junction with the exhaust gas manifold, is oriented in the direction of flow of the gases in said manifold.

The partial feature (a) just defined has for effect to lower the static pressure in the exhaust gas manifold and permits, as explained hereinbefore, the recovery of a large proportion of the utilizable energy available in the work chambers of the engine.

The partial feature (b) according to which the junction between the downstream portion of the bypass pipe and the inlet of the turbine is located in a part of the manifold where the velocity of the flow of the gases is minimum when the engine operates at its rated running speed, has for effect to reduce the pressure drops and to avoid a disturbance of the flow at high velocity from the exhaust gas manifold.

When the engine is running at its rated running speed, the ejection effect produced by the injection of a quantity of motion coming from each work chamber in the exhaust gas manifold specially arranged for this purpose, is maximum so that the static pressure prevailing at the head end of said manifold is minimum, i.e. precisely at the downstream point of junction between the bypass pipe and the exhaust gas manifold. The pressure difference exerted on each side of the throttling means (in the maximum closure position) of the bypass pipe is consequently maximum.

Inversely, when the engine operates at idling speed, or even when the engine is inoperative if the latter is provided with an auxiliary combustion chamber, the aforementioned ejection effect is minimum, and even nil. In this case, the major part (idling) or the totality (stoppage of the engine) of the flow in the exhaust gas manifold passes through the bypass pipe and through the throttling means of the latter in the position of maximum opening. In this situation, the total pressure drop, due to friction and changes in direction of the path of the flow throughout the length of the exhaust gas manifold, will be maximum, and consequently, the static pressure prevailing at the head end of the exhaust gas manifold, i.e. at the point of junction with the bypass pipe, will be maximum so that the pressure difference exerted on each side of the throttling means of the bypass pipe will be minimum.

It can be seen that this static pressure difference may vary within large proportions and may become double and even more, according to the running speed of the engine.

Now, it is moreover known that for the turbocompressor to operate at its maximum efficiency without encountering the problem of the surge of the compressor, the difference between the total pressure prevailing in the outlet of the compressor and the total pressure prevailing in the inlet of the turbine must be substantially insensitive to variations in the running speed of the engine and depend substantially only on the value of the total pressure prevailing in the outlet of the compressor.

This condition is therefore antinomic with the location of the throttling means of the bypass pipe.

There was consequently here a technical handicap to overcome, which shows the inventive activity involved in the solution provided by the invention and more particularly in its partial features (c) and (d).

In particular, owing to the partial feature (c), the throttling means are rendered insensitive to the static pressure difference that they produce owing to the flow therethrough.

As concerns the partial feature (d), it permits the accomplishment of the optimum condition of operation of the turbocompressor with no risk of surge of the compressor, irrespective of the running speed of the engine.

According to a first particularly advantageous solution, the aforementioned control means is constituted by a piston defining at least two variable-volume chambers, of which one communicates with a first cavity in which prevails a static pressure which varies in a bi-univocal manner in the same direction as the total pressure prevailing immediately in the inlet of the turbine, whereas the other communicates with a second cavity in which prevails a pressure $P_2^*$ which varies in a bi-univocal manner in the same direction as the total pressure prevailing in the outlet of the compressor upstream of said throttling means, this pressure $P_2^*$ being equal to a fraction of the pressure $P_2$.

According to a second solution which is also advantageous, the aforementioned control means is constituted by a differential piston including at least three movable or deformable active surfaces having different sections, the surface having the largest section defining a variable-volume chamber which communicates with a first cavity in which prevails a static pressure which varies in a bi-univocal manner in the same direction as the total pressure prevailing immediately upstream of the turbine, the other two active surfaces defining two other variable-volume chambers of which one communicates with a second cavity in which prevails a static pressure substantially equal to the total pressure prevailing in the outlet of the compressor upstream of said throttling means, and the other communicates with a third cavity in which prevails a reference pressure $P^*$.

Preferably, the aforementioned first cavity is constituted by a space located downstream of the distributor of the turbine and upstream of the wheel of said turbine. According to a variant relating to an engine whose turbocompressor unit comprises at least a first turbine and a second turbine diposed in series, the first cavity may be constituted by the connection between the outlet of the first turbine and the inlet of the second turbine.

The two solutions described hereinbefore permit achieving, with the maximum of simplicity, the optimum condition of operation of the turbocompressor with no risk of surge, irrespective of the running speed of the engine.

As explained hereinbefore, the invention is applicable, preferably but not exclusively, to internal combustion engines of the type defined hereinbefore, whose bypass pipe includes an auxiliary combustion chamber.

In this case, as the auxiliary combustion chamber is constituted by a primary combustion zone and a secondary dilution zone located downstream of said primary zone, the engine according to the invention may be moreover characterized in that the bypass pipe is divided into at least two branches, of which the first branch feeds air to said secondary zone and is provided with said throttling means, designated hereinafter "first throttling means", whereas the second branch feeds air to said primary zone and is provided with second throttling means whose passage section is variable independently of that of the first throttling means. Preferably, the second throttling means are connected to a second control means adapted to vary the section of passage of the second throttling means as a function of the pressure of the air prevailing in the outlet of the compressor in accordance with a previously-established law.

Lastly, according to an improvement which markedly simplifies the construction, said pipes are respectively formed by conical nozzles which are concentric with the exhaust gas manifold, and the whole of the manifold and the pipes is constituted by sections all of which are similar and each of which comprises, on one hand, a cylindrical core which has substantially the diameter of the exhaust gas manifold and whose downstream end, relative to the direction of flow of the gases, communicates either with the gas outlet of the preceding section, if it exists, or with the bypass pipe when it concerns the first section relative to the direction of flow of the gases and, on the other hand, a concentric case defining a cavity which communicates with the gas outlet of one of the work chambers and which cooperates with the downstream end of the cylindrical core so as to form a concentric nozzle. In the case where the bypass pipe includes an auxiliary combustion chamber formed by a primary combustion zone and a secondary dilution zone located downstream of said primary zone, the upstream end of the first section communicates with the gas outlet of said secondary dilution zone.

The invention will now be described in more detail with reference to the accompanying drawings which diagrammatically illustrate preferred embodiments.

FIGS. 5, 6 and 7 illustrate various ways of taking off the pressure $P_3$.

FIG. 8 shows partly an internal combustion engine arranged in accordance with a fifth embodiment of the invention and provided with an auxiliary combustion chamber.

Figure 1:
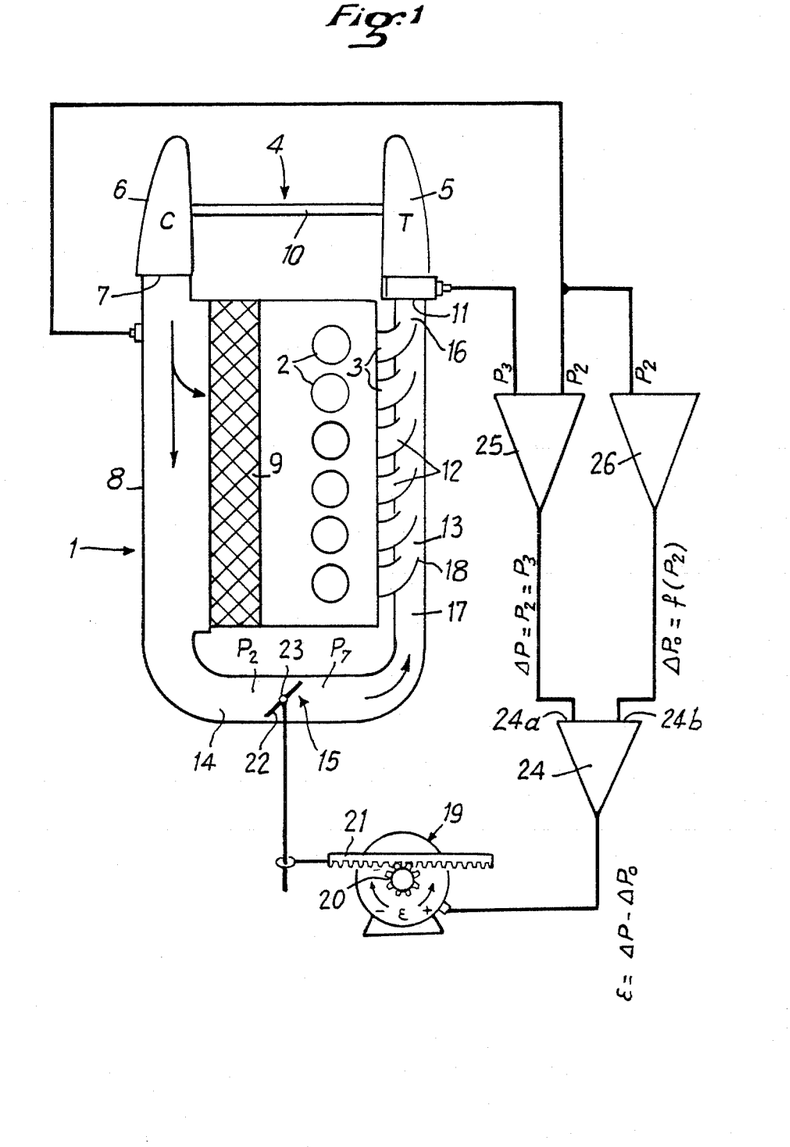
FIG. 1 shows diagrammatically an internal combustion engine arranged in accordance with a first embodiment of the invention, the throttling means of the bypass pipe being controlled by electric control means.

The supercharged Diesel engine 1, which is shown diagrammatically in FIG. 1, comprises variable-volume work chambers 2 which are each generally constituted by a cylinder whose volume is variable by the displacement of a piston. Each of these work chambers is provided with an air inlet (not shown) and a gas outlet 3. The engine 1 is supercharged by a turbocompressor unit 4 mainly comprising a turbine 5 and a compressor 6 whose outlet 7 communicates with the air inlet of each of the work chambers 2 through at least one intake manifold 8. A supercharging air cooler 9 is generally disposed downstream of this intake manifold 8. The compressor 6 is driven mechanically, for example through a shaft 10, by the turbine 5 whose gas inlet 11 is connected to the gas outlet 3 of the work chambers 2 through individual gas pipes 12 and at least one exhaust gas manifold 13.

The engine 1 comprises a bypass pipe 14 which is provided with throttling means 15 having a passage of variable section and putting the air outlet 7 of the compressor 6 in communication with the gas inlet 11 of the turbine 5 by by-passing the work chambers 2. The throttling means 15 are so arranged as to produce a pressure drop $P_2 - P_7$ ($P_2$ and $P_7$ being the pressures prevailing respectively on each side of the throttling means 15) so that the resulting difference between the total pressure $P_2$ prevailing in the outlet 7 of the compressor 6 and the total pressure $P_3$ prevailing in the inlet 11 of the turbine 5 is substantially independent of the ratio between the air flow in the bypass pipe 14 and the flow delivered by the compressor 6 but which varies in the same direction as said pressure $P_2$.

In this situation according to the invention, the exhaust gas manifold 13 has a section which is substantially constant and sufficiently small to ensure, when the engine 1 is running at normal speed, the velocity of the flow of gas in this manifold 13, directly downstream of the last junction 16 with the pipes 12, is equal to at least the Mach number 0.3. "Last junction" is intended to mean that which is designated by the reference numeral 16 and is the last to be reached by the gases flowing in the manifold 13.

For example, for a 12-cylinder four-stroke engine whose cylinder bore is 160 mm and whose mean velocity of the pistons at the rated running speed is 10 m/s, and which is fed with air at 10 bars and 60° C. and whose exhaust gas manifold is travelled through by the gases at 600° C. under a pressure of 5 bars, this manifold would have an inside diameter of less than 84 mm (m>0.3) or less than 55 mm (m>0.7).

Further, the junction 17 between the bypass pipe 14, downstream of the throttling means 15, and the gas inlet 11 of the turbine 5 is located upstream, relative to the direction of flow of the gases coming from the work chambers 2 and travelling through the gas manifold 13, of the first junction 18 between the manifold 13 and the pipes 12.

The throttling means 15 are so adapted that the sum of the forces due to the pressure drop they produce and applied to these throttling means 15, is compensated by a balancing force which is such that the resultant of these forces is substantially nil.

These throttling means 15 may be by construction insensitive to the pressure drop they produce in the flow passing therethrough—such as a sliding gate valve or a sliding or turning plug valve. They may also be by construction subjected to opposing forces owing to the pressure drop they produce, which substantially cancel each other out, as for example a balanced butterfly valve. They may also be sensitive to the pressure drop they produce, like a seated valve for example, but mechanically connected to a balancing means which by construction compensates the force resulting from the action of the pressure drop on the throttling means with an opposing force of the same magnitude.

The throttling means 15 are connected to a control means responsive to a first parameter of operation of the engine 1 related in a bi-univocal manner to the total pressure $P_2$ prevailing directly in the outlet of the compressor 6 and to a second parameter of operation of the engine 1 related in a bi-univocal manner to the total pressure $P_3$ prevailing directly upstream of the turbine 5. This control means, which will be described in more detail hereinafter, is so adapted that, on one hand, it tends to close the throttling means 15 when these two pressures tend to approach each other and reciprocally tends to open the throttline means 15 when these pressures tend to depart from each other and, on the other hand, the difference of these pressures mainly only depends on the total pressure prevailing in the outlet of the compressor 6 and varies in the same direction as this total pressure.

According to the embodiment shown in FIG. 1, the throttling means 15 are constituted by a balanced butterfly 22 keyed on a rotary shaft 23 and the control means is formed by a reversible electric motor 19 which drives the shaft 23 through a mechanical transmission which has been shown by way of example to include a gear pinion 20 keyed on the shaft of the electric motor 19 and a rack 21 engaged with this pinion 22 and connected to the shaft 23 of the butterfly 20. The electric motor 19 is fed with current which varies in the same direction as the value of the difference $\epsilon = \Delta P - \Delta P_o$ by means of a comparator 24 whose inputs 24a and 24b respectively receive from comparators 25 and 26 signals respectively representing the differences $\Delta P = P_2 - P_3$ and $\Delta P_o = f(P_2)$.

Figure 2:
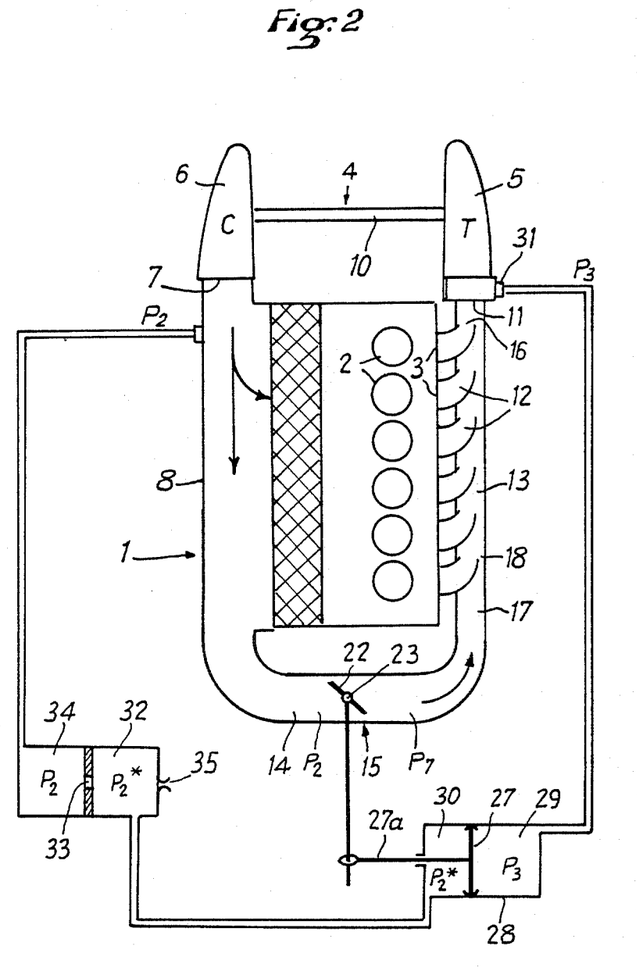
FIGS. 2, 3, and 4 show diagrammatically an internal combustion engine arranged with three other embodiments of the invention in which the throttling means of the bypass pipe are controlled by varius pneumatic control means.

According to the embodiment shown in FIG. 2 the aforementioned control means is constituted by a piston 27 which defines, in a cylinder 28, two variable-volume chambers 29 and 30 of which one, 29, communicates with a first cavity (pressure sensor) 31 in which prevails a static pressure which varies in a bi-univocal manner in the same direction as the total pressure $P_3$, whereas the other chamber, 30, communicates with a second cavity 32 in which prevails a pressure $P_2^*$ which varies in a bi-univocal manner in the same direction as the total pressure $P_2$, this pressure $P_2^*$ being a fraction of the pressure $P_2$. For this purpose, the cavity 32 may communicate, through a first calibrated orifice 33, with a chamber 34 in which prevails the pressure $P_2$ and, through a second calibrated orifice 35, with the atmosphere. In this case, $P_3 = P_2^* = kP_2$ and $\Delta P = P_2 - P_3 = (1-k)P_2$. The rod 27a of the piston 27 is connected to the throttling means 15 like the the rack 21 of the embodiment of FIG. 1.

Figure 3:
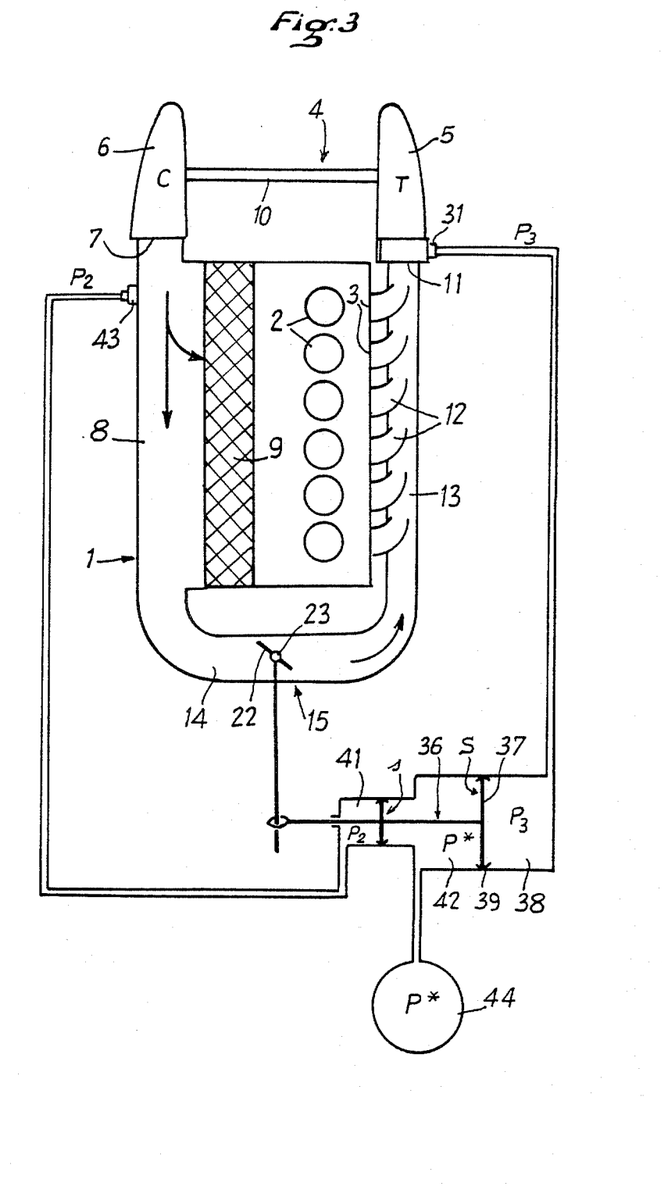
Figure 4:
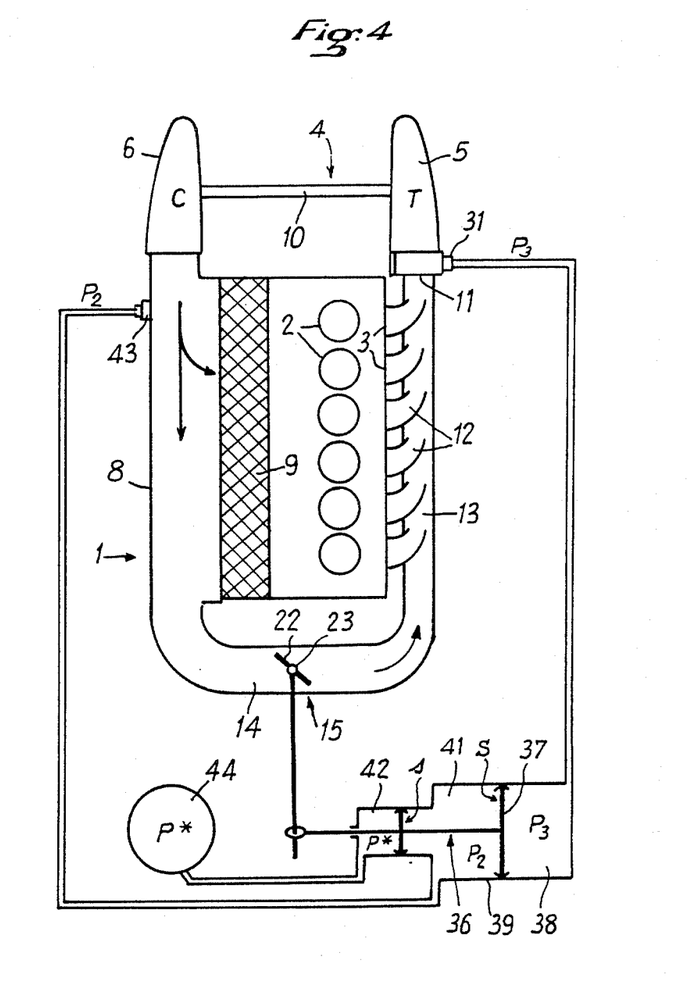

According to the embodiments of FIGS. 3 and 4, the control means is constituted by a differential piston 36 having three movable active surfaces of different sections, that of the largest section 37 defining a variable-volume chamber 38 which communicates with a first cavity 31 in which prevails a static pressure varying in a bi-univocal manner in the same direction as the pressure $P_3$ and for example equal to this pressure $P_2$, the other two active surfaces defining two other variable-volume chambers 41 and 42 of which the chamber 41 communicates with a second cavity 43 in which prevails a static pressure substantially equal to the total pressure prevailing in the outlet of the compressor 6, upstream of the throttling means 15, whereas the other chamber; and 42 communicates with a third cavity 44 in which prevails a reference pressure $P^*$.

Generally, the differential piston 36 defines by its two ends, inside a differential cylinder 39, a chamber 38 of large section and a chamber of small section as well as an intermediate chamber whose active surface is constituted by the difference between the sections of the two end chambers.

According to the embodiment of FIG. 3, the chamber 41 is the end chamber remote from the chamber 38 while the chamber 42 is the intermediate chamber. If S and s respectively designate the surface of large section and the surface of small section of the differential piston 36, the balance of the piston 36 is expressed by the following equations:

$$P_3 \cdot S = P_2 \cdot s + P^*(S-s)$$

$$\Delta P = P_2 - P_3 = (P - P^*) \times \frac{S-s}{S}.$$

According to the embodiment of FIG. 4, the chamber 41 is the intermediate chamber and the chamber 42 the end chamber remote from the chamber 38. The balance of the piston 36 is expressed by the following equations:

$$P_3 \cdot S = P^* \cdot s + P(S-s)$$

$$\Delta P = P_2 - P_3 = (P_2 - P^*) \times \frac{s}{S}.$$

FIGS. 5, 6 and 7 illustrate various ways of constituting what may be termed the "first cavity" from which is taken off a static pressure varying in a bi-univocal manner in the same direction as the total pressure $P_3$ prevailing immediately upstream of the turbine 5.

In FIG. 5, there is shown a turbine 5 having a single stage with its diffuser 45, its distributor 46 and its rotor 47, the diffuser 45 ensuring a progressive increase in the section and consequently a slowing down of the flow. In this cae, the pressure $P_3$ is taken off through a pipe 48 at the inlet of the rotor 47 downstream of the distributor 46.

FIG. 6 also shows a turbine 5 having a single stage but without a distributor, and with a gas inlet housing so dimensioned that the velocity of the gases therein has a substantially constant value equal to the velocity in the outlet of the exhaust gas manifold 13, this housing being designated by the reference numeral 49. In this case, the pressure $P_3$ is taken off through a pipe 48 in the outlet of the exhaust gas manifold 13.

Shown in FIG. 7 is a turbine 5 having two stages, namely a low pressure stage 5a and a high pressure stage 5b. In this case, the pressure $P_3$ is taken off between the two stages 5a and 5b of the turbine 5.

In the embodiment shown partially in FIG. 8, the bypass pipe 14 comprises an auxiliary combustion chamber 50 which is divided, from the upstream end to the downstream end, into a primary combustion zone 51 and a secondary dilution zone 52. This auxiliary combustion chamber 50 comprises a gas outlet 53 which communicates with the upstream part of the manifold 13. The primary zone 51 comprises at least one fuel feed nozzle 58 which is connected through a pipe 54 to a source of fuel under pressure (not shown). With the aid of second throttling means 55, the air flow introduced into the auxiliary combustion chamber 50 is divided beteen the primary zone 51 and secondary zone 52 so as to adapt the air flow admitted into the primary zone 51 to the flow of the fuel introduced through the feed nozzle 58. Reference may be made to U.S. Pat. No. 4,430,860 and to various other patents of the French State to obtain further details concerning the throttling means 55 and the auxiliary combustion chamber 50. Thus it can be seen that, in the region of this auxiliary combustion chamber 50, the bypass pipe 14 is divided into two branches of which the first branch 56 is provided with first throttling means 15 whereas the second branch 57 is provided with second throttling means 55. Apart from the auxiliary combustion chamber 50, the embodiment of FIG. 8 is for example the same as FIG. 3.

Preferably, the second throttling means 55 are connected to a second control means 66 (see FIG. 10) adapted to vary the section of the passage of these second throttling means 55 as a function of the pressure of the air prevailing in the outlet of the compressor 6 in accordance with a previously-established law.

Figure 10:
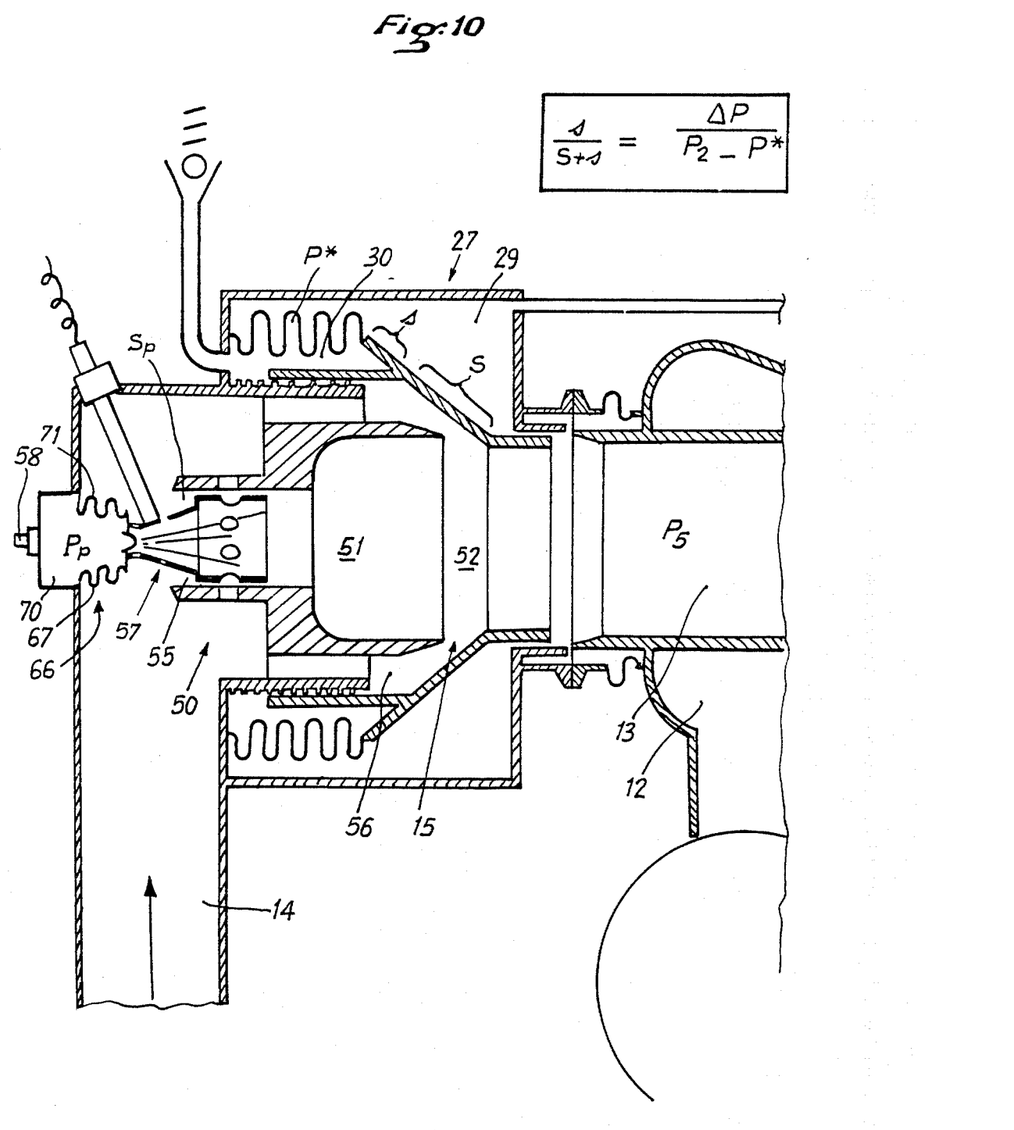
FIG. 10 shows, to an enlarged scale, a detail of FIG. 9.

This control means 66 could be for example a bellows 67 separating an outer space and an inner space, of which the first or outer space is at pressure $P_2$ and the second or inner space 70 is at an adjustable reference pressure $P_p$. The bellows subjected to the difference between the pressures $P_2 - P_p$ is also subjected to the action of a spring 71 incorporated in the bellows 67 and which is previously calibrated so that the passage section $S_p$ diminishes when the air pressure $P_2$ increases in accordance with a law pre-established as a function of the settings of the tension of the spring 71 and of the reference pressure $P_p$.

Whatever embodiment is chosen, each of the pipes 12 advantageously has the shape of a convergent nozzle whose outlet,as can be seen in FIGS. 1 to 4 and 8, at the junction with the manifold 13, is oriented in the direction of flow of the gases in this manifold.

Figure 9:
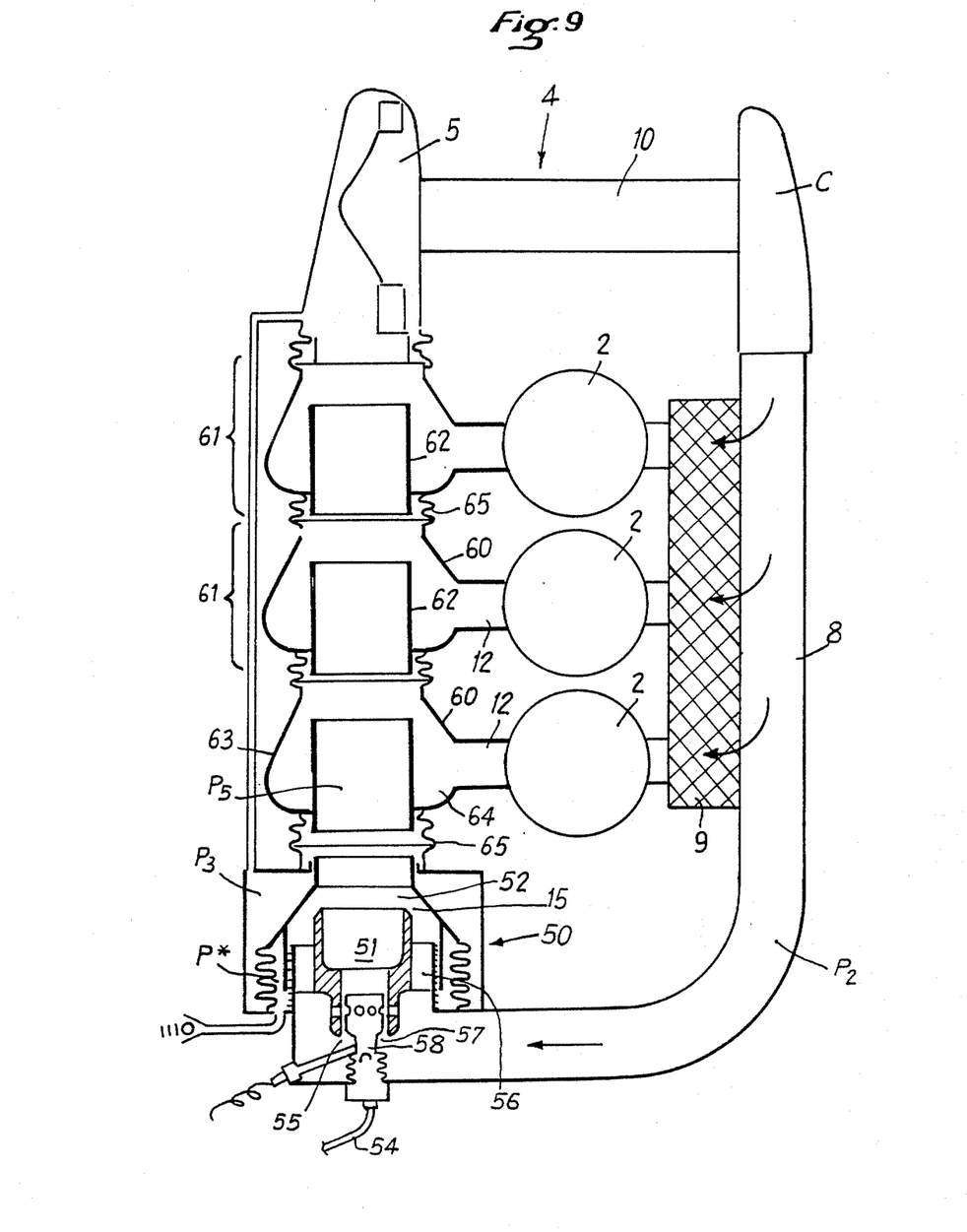
FIG. 9 shows diagrammatically an internal combustion engine arranged in accordance with a sixth embodiment of the invention and also provided with an auxiliary combustion chamber.

In order to simplify construction, as shown in FIG. 9, the pipes 12 are respectively constituted by conical nozzles 60, concentric with the exhaust gas manifold 13. The assembly of this manifold 13 and the pipes 12 is constituted by sections 61 which are similar and each comprise, on one hand, a cylindrical core 62 and, on the other hand, a concentric case 63. The cylindrical core 62 has the diameter of the exhaust gas manifold 13. The upstream end (with respect to the direction of flow of the gases) of each section communicates either with the gas outlet of the preceding section, if one exists, or with the bypass pipe 14 when it concerns the first section with respect to the direction of flow of the gases (i.e. the lower section in FIG. 9). The concentric case 63 defines a cavity 64 which communicates with the gas outlet of one of the work chambers 2 and which cooperates with the downstream end of the cylindrical core 62 so as to form a concentric nozzle. In the case where the bypass pipe 14 has an auxiliary combustion chamber 50 constituted by a primary combustion zone 51 and a secondary dilution zone 52 located downstream of said primary zone 51, the upstream end of the first section communicates with the gas outlet of the secondary zone 52. Sealing means 65 of known type are interposed between successive sections 61 and between the dilution zone 52 of the auxiliary combustion chamber 50 and the section 61 located directly downstream of this chamber.

The rest of the engine shown in FIG. 9 is of known type and reference may be made to U.S. Pat. No. 4,026,115 for more details.

According to the embodiment of FIG. 10 which is an enlargement of FIG. 9, the first throttling means 15 are of the type described with reference to FIGS. 3, 4 and 8. The throttling element proper is a movable cylindrical plug which is axially slidable and has the same diameter and axis as the auxiliary combustion chamber which is fixed.

Let us consider the operation of the installation with a rated pressure ratio of turbocompressors delivering air at the pressure:

$P_2 = 10$ bars.

a. Operation as a gas turbine with the engine stopped (see FIG. 11).

Figure 11:
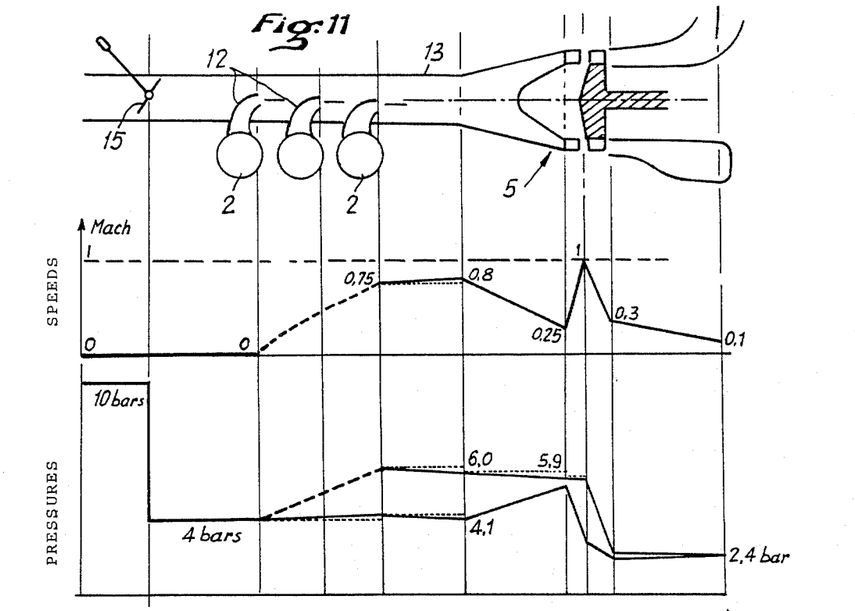
FIGS. 11 and 12 illustrate the operation of the embodiment of FIGS. 9 and 10 by diagrams of velocities and pressures along the exhaust gas manifold, respectively when the first throttling means are closed and opened to the maximum extent.
Figure 12:
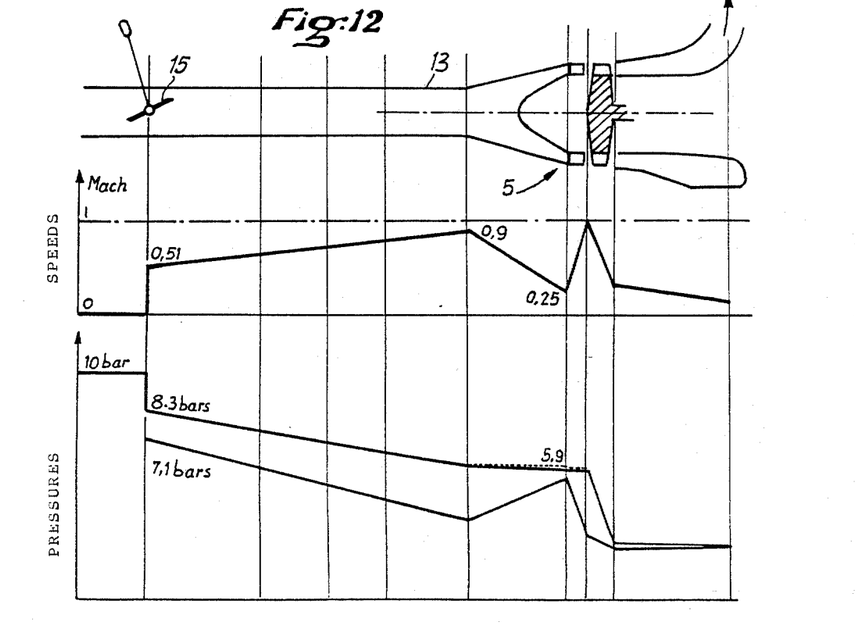

The whole of the air delivered by the compressor passes through the bypass pipe 14 and enters the primary combustion zone 51 through the second throttling means 55 in their position of maximum opening, and the secondary dilution zone 52 through the first throttling means 15 in their position of maximum opening.

The rate of flow of the fuel in the chamber is also maximum owing to a suitable adjustment of the reference pressure $P_p$ in the inner space 70.

The exhaust gas manifold 13 acts as a passive element resulting in a pressure drop by the effect of friction and changes in the path of the flow. The total pressure in the inlet of the turbine is equal to:

$P_3 = 5.9$ bars.

The total pressure in the inlet of the exhaust gas manifold is 8.3 bars, the pressure drop in the flow in this manifold being: $8.3 - 5.9 = 2.4$ bars, namely 29% of the total inlet pressure. The pressure drop created in the passage of the air through the first throttling means 15 is: $10 - 8.3 = 1.7$ bars, namely 17% of the total pressure of the air delivered by the compressor.

b. Operation of the engine at the rated power (maximum speed and load) (see FIG. 11).

The air flow in the bypass pipe is substantially nil (just sufficient to permit the combustion of a pilot flow in the auxiliary combustion chamber), the second throttling means 55 and the first throttling means 15 being in their position of minimum opening. The injection of a quantity of motion by the pipes 12 in the exhaust gas manifold 13 is maximum. The exhaust gas manifold behaves as an active element, "with a negative pressure drop", in that the total pressure of the flow increases between the upstream and downstream ends.

If the total pressure of the flow is again:

$P_3 = 5.9$ bars in the inlet of the turbine, it will be only 4 bars in the inlet of the exhaust gas manifold 13.

The injection of a quantity of motion by the pipes 12 will have thus brought about an increase in the total pressure of the flow of 1.9 bars.

As the velocity of the flow in the inlet of the exhaust gas manifold 13 is nil (the bypass pipe 14 being substantially closed), the static pressure in the exhaust gas manifold 13 will be equal to the total pressure, namely:

$P_5 = 4$ bars.

The pressure drop across the first throttling means 15 will therefore be:

$$\Delta P = P_2 - P_5 = 10 - 4 = 6 \text{ bars},$$

i.e. 60% of the total pressure of the air delivered by the compressor.

This pressure drop is in this case 3.5 times higher, in this operation at the rated running speed of the engine, than in the operation with the motor stopped, whereas the total pressure difference between the compressor and the turbine has not varied.

This numerical example illustrates the advantage of the invention over a solution of the previously-known type, such as that disclosed in U.S. Pat. No. 4,026,115, which would have resulted in very large variations in the pressure difference $P_2 - P_3$ if there were taken as parameters of the regulation of the first throttling means 15 the pressures $P_2$ and $P_7$ prevailing directly across said first throttling means. These large variations in pressure would have prevented, as is known, the turbocompressor from operating in its optimum zone of operation near the surge line. The invention permits this association of the adaptation of the turbocompressor as indicated hereinbefore with an optimum mode of operation, and the exhaust gas manifold of the type described hereinbefore which enables the static pressure prevailing in the exhaust gas manifold to be lowered and consequently enables the work involved in discharging the exhaust gases escaping from the work chambers to be reduced with therefore a marked reduction in the consumption of fuel of the engine.

What is claimed is:

1. In an internal combustion engine comprising variable-volume work chambers each provided with at least one air inlet and at least one exhaust gas outlet, a turbocompressor unit for supercharging the engine and comprising at least one compressor having an air inlet and an air outlet and at least one turbine connected to mechanically drive the compressor and having a gas inlet and a gas outlet, each of said air inlets of the work chambers communicating with the air outlet of the compressor, at least one exhaust gas manifold connected to the gas inlet of the turbine, exhaust gas pipes respectively connecting the exhaust gas outlets to the exhaust gas manifold, a junction being provided between each exhaust gas pipe and the exhaust gas manifold, said engine further comprising a bypass pipe which connects the air outlet of the compressor to the gas inlet of the turbine by bypassing the work chambers, throttling means inserted in the bypass pipe and defining a passage of variable section so adapted as to produce such pressure drop that a resulting pressure difference between the air outlet of the compressor and the gas inlet of the turbine substantially only depends on the value of the pressure prevailing in the air outlet of the compressor; the improvements comprising in combination:

a. said work chambers, said exhaust gas outlets, said exhaust gas pipes and said exhaust gas manifold being constructed and arranged to cooperate, with respect to exhaust gas flow orientation and velocity in said manifold, with the cross-sectional area of said exhaust gas manifold, which is a substantially constant section and sufficiently small such that, at any rated running speed of and load on the engine, the velocity of the flow of the gases in the manifold, directly downstream of the last junction between the exhaust pipes and the manifold, relative to the direction of flow of the gases in the manifold, is equal to at least the Mach number 0.3;

b. the junction between the bypass pipe and the gas inlet of the turbine is located downstream of the throttling means and upstream of the first junction between said manifold with said exhaust pipes, relative to the direction of flow of the gases coming from the work chambers and traveling through the exhaust gas manifold toward the turbine inlet;

c. said throttling means are so adapted that the sum of forces due to a pressure drop which they produce and which is applied to said throttling means, is compensated by a balancing force such that the resultant of these forces is substantially nil; and d. a control means operably connected to said throttling means and including pressure sensing means operably coupled to said compressor outlet and said turbine inlet for directly sensing the pressure prevailing at said outlet and inlet such that said control means is responsive to a first parameter of operation of the engine related in a bi-univocal manner to the total pressure prevailing directly in the outlet of the compressor and to a second parameter of operation of the engine related in a bi-univocal manner to the total pressure prevailing directly upstream of the turbine, said control means being so adapted that it tends to close said throttling means when said two total pressures tend to approach each other and reciprocally tends to open said throttling means when said total pressures tend to depart from each other and that the difference between said total pressures substantially depends only on the total pressure prevailing in the outlet of the compressor and varies in the same direction as the last-mentioned total pressure.

2. An engine according to claim 1, wherein said exhaust gas pipes each have a shape of a convergent nozzle having an outlet at the respective junction with the exhaust gas manifold, which is oriented in the direction of flow of the gases in said manifold.

3. An engine according to claim 1, wherein said control means comprises means defining a first cavity and a second cavity, a piston defining at least two variable-volume chambers of which one of said chambers communicates with the first cavity in which prevails a static pressure which varies in a bi-univocal manner in the same direction as the total pressure prevailing immediately in the gas inlet of the turbine, whereas the other chamber communicates with the second cavity in which prevails a pressure $P_2^*$ which varies in a bi-univocal manner in the same direction as the total pressure which prevails in the outlet of the compressor upstream of said throttling means, said pressure $P_2^*$ being equal to a fraction of the pressure $P_2$.

4. An engine according to claim 2, wherein said control means comprises means defining a first cavity and a second cavity, a piston defining at least two variable-volume chambers of which one of said chambers communicates with the first cavity in which prevails a static pressure which varies in a bi-univocal manner in the same direction as the total pressure prevailing immediately in the gas inlet of the turbine, whereas the other chamber communicates with the second cavity in which prevails a pressure $P_2^*$ which varies in a bi-univocal manner in the same direction as the total pressure which prevails in the outlet of the compressor upstream of said throttling means, said pressure $P_2^*$ being equal to a fraction of the pressure $P_2$.

5. An engine according to claim 1, wherein said control means comprises means defining a first cavity, a second cavity and a third cavity, a differential piston having at least three active surfaces which are movable and have different sections, one of said three surfaces having the largest section defining a variable-volume chamber which communicates with the first cavity in which prevails a static pressure which varies in a bi-univocal manner in the same direction as the total pressure prevailing immediately upstream of the turbine, the other two surfaces of said active surfaces defining two other variable-volume chambers of which one chamber communicates with the second cavity in which prevails a static pressure substantially equal to the total pressure prevailing in the outlet of the compressor upstream of said throttling means relative to the direction of flow of the air in the bypass pipe, and the other chamber communicates with the third cavity in which prevails a reference pressure $P^*$.

6. An engine according to claim 1, wherein said control means comprises means defining a first cavity, a second cavity and a third cavity, a differential piston having at least three active surfaces which are deformable and have different sections, one of said three surfaces having the largest section defining a variable-volume chamber which communicates with the first cavity in which prevails a static pressure which varies in a bi-univocal manner in the same direction as the total pressure prevailing immediately upstream of the turbine, the other two surfaces of said active surfaces defining two other variable-volume chambers of which one chamber communicates with the second cavity in which prevails a static pressure substantially equal to the total pressure prevailing in the outlet of the compressor upstream of said throttling means relative to the direction of flow of the air in the bypass pipe, and the other chamber communicates with the third cavity in which prevails a reference pressure $P^*$.

7. An engine according to claim 3, wherein the turbine comprises a distributor and a wheel and said first cavity comprises a space located downstream of the distributor and upstream of the wheel of the turbine relative to the flow of the gases.

8. An engine according to claim 5, wherein the turbine comprises a distributor and a wheel and said first cavity comprises a space located downstream of the distributor and upstream of the wheel of the turbine relative to the flow of the gases.

9. An engine according to claim 6, wherein the turbine comprises a distributor and a wheel and said first cavity comprises a space located downstream of the distributor and upstream of the wheel of the turbine relative to the flow of the gases.

10. An engine according to claim 3, whose turbocompressor unit comprises at least a first turbine and a second turbine having an inlet and an outlet and disposed in series with the first turbine, the first cavity being constituted by a connection between the outlet of the first turbine and the inlet of the second turbine.

11. An engine according to claim 5, whose turbocompressor unit comprises at least a first turbine and a second turbine having an inlet and an outlet and disposed in series with the first turbine, the first cavity being constituted by a connection between the outlet of the first turbine and the inlet of the second turbine.

12. An engine according to claim 6, whose turbocompressor unit comprises at least a first turbine and a second turbine having an inlet and an outlet and disposed in series with the first turbine, the first cavity being constituted by a connection between the outlet of the first turbine and the inlet of the second turbine.

13. An engine according to claim 1, wherein the bypass pipe comprises an auxiliary combustion chamber constituted by a primary combustion zone and a secondary dilution zone located downstream of said primary zone relative to the flow, the bypass pipe being divided into at least two branches of which the first branch is connected to feed air to said secondary zone and is provided with said throttling means, hereinafter designated first throttling means, whereas the second branch is connected to feed air to said primary zone and is provided with second throttling means defining a passage having a section which is variable independently of the section of the passage of the first throttling means.

14. An engine according to claim 13, comprising a second control means connected to the second throttling means, the second control means being adapted to vary the passage section of said second throttling means as a function of the pressure of the air prevailing in the outlet of the compressor.

15. An engine according to claim 13, wherein said exhaust gas pipes are respectively constituted by frustoconical nozzles concentric with the exhaust gas manifold, and the manifold and the exhaust gas pipes constitute an assembly comprising sections which are all similar and each comprise an exhaust gas outlet, a cylindrical core which has a diameter substantially the same as the diameter of the exhaust gas manifold, a downstream end and an upstream end, relative to the direction of flow of the gases, the upstream end communicating either with the exhaust gas outlet of the preceding section, if one exists, or with the bypass pipe when it concerns the first section, relative to the direction of flow of the gases, each section further comprising a concentric case defining a cavity which communicates with the exhaust gas outlet of the respective one of the work chambers and which cooperates with the downstream end of the respective cylindrical core so as to form a concentric nozzle.

16. An engine according to claim 14, wherein said exhaust gas pipes are respectively constituted by frustoconical nozzles concentric with the exhaust gas manifold, and the manifold and the exhaust gas pipes constitute an assembly comprising sections which are all similar and each comprise an exhaust gas outlet, a cylindrical core which has a diameter substantially the same as the diameter of the exhaust gas manifold, a downstream end and an upstream end, relative to the direction of flow of the gases, the upstream end communicating either with the exhaust gas outlet of the preceding section, if one exists, or with the bypass pipe when it concerns the first section, relative to the direction of flow of the gases, each section further comprising a concentric case defining a cavity which communicates with the exhaust gas outlet of the respective one of the work chambers and which cooperates with the downstream end of the respective cylindrical core so as to form a concentric nozzle.

17. An engine according to claim 13, wherein said exhaust gas pipes are respectively constituted by frustoconical nozzles concentric with the exhaust gas manifold, and the manifold and the exhaust gas pipes constitute an assembly comprising sections which are all similar and each comprise an exhaust gas outlet, a cylindrical core which has a diameter substantially the same as the diameter of the exhaust gas manifold, a downstream end and an upstream end, relative to the direction of flow of the gases, the upstream end communicating either with the exhaust gas outlet of the preceding section, if one exists, or with the bypass pipe when it concerns the first section, relative to the direction of flow of the gases, each section further comprising a concentric case defining a cavity which communicates with the exhaust gas outlet of the respective one of the work chambers and which cooperates with the downstream end of the respective cylindrical core so as to form a concentric nozzle, the upstream end of the first section communicating with a gas outlet of said secondary diluting zone.

18. An engine according to claim 14, wherein said exhaust gas pipes are respectively constituted by frusto-conical nozzles concentric with the exhaust gas manifold, and the manifold and the exhaust gas pipes constitute an assembly comprising sections which are all similar and each comprise an exhaust gas outlet, a cylindrical core which has a diameter substantially the same as the diameter of the exhaust gas manifold, a downstream end and an upstream end, relative to the direction of flow of the gases, the upstream end communicating either with the exhaust gas outlet of the preceding section, if one exists, or with the bypass pipe when it concerns the first section, relative to the direction of flow of the gases, each section further comprising a concentric case defining a cavity which communicates with the exhaust gas outlet of the respective one of the work chambers and which cooperates with the downstream end of the respective cylindrical core so as to form a concentric nozzle, the upstream end of the first section communicating with a gas outlet of said secondary diluting zone.

* * * * *